(12) United States Patent
Burd

(10) Patent No.: US 11,788,472 B2
(45) Date of Patent: Oct. 17, 2023

(54) ENGINE BLEED GENERATORS AND AIRCRAFT GENERATOR SYSTEMS

(71) Applicant: RTX Corporation, Farmington, CT (US)

(72) Inventor: Steven W. Burd, Cheshire, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 17/479,502

(22) Filed: Sep. 20, 2021

(65) Prior Publication Data

US 2022/0333533 A1 Oct. 20, 2022

Related U.S. Application Data

(60) Provisional application No. 63/174,632, filed on Apr. 14, 2021.

(51) Int. Cl.
| | | |
|---|---|---|
| *F02C 7/36* | (2006.01) | |
| *F02C 7/32* | (2006.01) | |
| *F02C 7/18* | (2006.01) | |

(52) U.S. Cl.
CPC ............... *F02C 7/36* (2013.01); *F02C 7/185* (2013.01); *F02C 7/32* (2013.01); *F05D 2220/323* (2013.01); *F05D 2220/76* (2013.01)

(58) Field of Classification Search
CPC ........ F01D 11/24; F02C 6/06–10; F02C 7/32; F02C 7/277; F02C 7/143; F02C 7/185; B64D 2013/0648; B64D 2013/0611; B64D 2013/0618; B64D 2013/0622; B64D 2013/0633; F05D 2220/62
See application file for complete search history.

(56) References Cited

U.S. PATENT DOCUMENTS

| | | | |
|---|---|---|---|
| 5,137,230 A * | 8/1992 | Coffinberry | B64C 21/06 244/58 |
| 5,899,085 A | 5/1999 | Williams | |
| 6,662,575 B2 | 12/2003 | Clarke | |
| 8,063,501 B2 * | 11/2011 | Finney | H02K 16/005 290/52 |
| 8,789,376 B2 | 7/2014 | Coffinberry | |
| 10,450,074 B2 | 10/2019 | Stieger et al. | |
| 10,738,695 B2 | 8/2020 | Himmelmann et al. | |
| 10,914,242 B2 | 2/2021 | Staubach et al. | |
| 10,954,865 B2 * | 3/2021 | Mackin | B64D 13/06 |
| 2018/0045114 A1 * | 2/2018 | Bayles | F02C 6/08 |
| 2021/0039794 A1 | 2/2021 | Lo | |

* cited by examiner

*Primary Examiner* — Stephanie Sebasco Cheng
(74) *Attorney, Agent, or Firm* — CANTOR COLBURN LLP

(57) ABSTRACT

Aircraft generator systems are described. The aircraft generator systems include a main engine having a fan and a compressor section, a generator assembly having at least one expansion turbine operably connected to a generator, and a working fluid flow path defined between at least one extraction point at at least one of the fan and the compressor section of the main engine and at least one outlet, wherein the working fluid is configured to flow through the at least one expansion turbine to generate power at the generator. There are no heat exchangers arranged between the at least one extraction point and the at least one outlet along the working fluid flow path.

13 Claims, 8 Drawing Sheets

ENGINE BLEED GENERATORS AND AIRCRAFT GENERATOR SYSTEMS

CROSS-REFERENCE TO RELATED APPLICATIONS

This application claims the benefit of U.S. Provisional Application Ser. No. 63/174,632 filed Apr. 14, 2021, the disclosure of which is incorporated herein by reference in its entirety.

BACKGROUND

The subject matter disclosed herein generally relates to gas turbine engines and, more particularly, to engine bleed generators and aircraft generator systems onboard aircraft.

Aircraft need to reject heat from electrical systems and components that are used for avionics, sensors, and other systems and/or electronics. The engines onboard aircraft are often employed to operate as a sink to which this heat may be dissipated. Heat rejection is often proceeded through aircraft cooling systems such as air cycle systems (ACS), vapor-air cycle systems (VACS), and/or environmental control systems (ECS) that release the energy through heat exchangers arranged within or along an engine bypass (e.g., bypass air stream). The use of bypass heat exchangers can be challenging from a performance, cost, and packaging standpoint, especially as heat loads continue to grow over time with new electrical demands on aircraft. The heat exchangers can take different forms including pre-coolers which process bleed flow and waste heat exchangers which release heat from the ACS, VACS, and/or ECS.

Furthermore, modern gas turbine engine cycles are being pushed to operate at higher overall pressure ratios (OPRs) for thermal efficiency and performance. The high OPR means, though, that the engines are producing higher compressor exit temperatures which challenge the durability of the flow path components and disks in the turbine (and potentially the compressor and the combustor). Cooled cooling air is an approach to reduce the temperature of the cooling air used by pulling bleed off the core and then reducing the temperature through heat exchange in the bypass. Heat exchangers for cooled cooling air can be very complicated and expensive to produce and challenged by temperatures and pressures in which they need to operate. Alternatives to these heat exchangers could benefit aircraft systems and gas turbine engine systems.

SUMMARY

According to some embodiments, aircraft generator systems are provided. The aircraft generator systems include a main engine having a fan and a compressor section, a generator assembly having at least one expansion turbine operably connected to a generator, and a working fluid flow path defined between at least one extraction point at at least one of the fan and the compressor section of the main engine and at least one outlet, wherein the working fluid is configured to flow through the at least one expansion turbine to generate power at the generator. No heat exchangers are arranged between the at least one extraction point and the at least one outlet along the working fluid flow path.

In addition to one or more of the features described above, or as an alternative, further embodiments of the aircraft generator systems may include that the generator assembly comprises a first expansion turbine and a second expansion turbine.

In addition to one or more of the features described above, or as an alternative, further embodiments of the aircraft generator systems may include that the generator assembly comprises a boost compressor arranged along the working fluid flow path and wherein the first expansion turbine is connected to a generator shaft connected to the generator and the second expansion turbine is connected to a compressor shaft connected to the boost compressor.

In addition to one or more of the features described above, or as an alternative, further embodiments of the aircraft generator systems may include that the generator shaft and the compressor shaft are decoupled from each other.

In addition to one or more of the features described above, or as an alternative, further embodiments of the aircraft generator systems may include that the generator shaft and the compressor shaft are coupled to each other by a geared connection.

In addition to one or more of the features described above, or as an alternative, further embodiments of the aircraft generator systems may include that the generator assembly further comprises a boost compressor arranged along the working fluid flow path.

In addition to one or more of the features described above, or as an alternative, further embodiments of the aircraft generator systems may include that boost compressor is arrange upstream from the at least one expansion turbine along the working fluid flow path.

In addition to one or more of the features described above, or as an alternative, further embodiments of the aircraft generator systems may include that boost compressor is arrange downstream from the at least one expansion turbine along the working fluid flow path.

In addition to one or more of the features described above, or as an alternative, further embodiments of the aircraft generator systems may include that the compressor section comprises a low pressure compressor and a high pressure compressor.

In addition to one or more of the features described above, or as an alternative, further embodiments of the aircraft generator systems may include that the at least one extraction point comprises one or more extraction points arranged about the low pressure compressor of the main engine.

In addition to one or more of the features described above, or as an alternative, further embodiments of the aircraft generator systems may include that the at least one extraction point comprises one or more extraction points arranged about the low pressure compressor of the main engine.

In addition to one or more of the features described above, or as an alternative, further embodiments of the aircraft generator systems may include that the at least one extraction point comprises one or more extraction points arranged aft of the high pressure compressor of the main engine.

In addition to one or more of the features described above, or as an alternative, further embodiments of the aircraft generator systems may include that the at least one extraction point comprises two or more extraction points arranged at different axial positions along an axis of the main engine.

In addition to one or more of the features described above, or as an alternative, further embodiments of the aircraft generator systems may include an aircraft cooling system, wherein an outlet of the at least one outlet of the working fluid flow path is fluidly connected to the aircraft cooling system downstream of the at least one expansion turbine.

In addition to one or more of the features described above, or as an alternative, further embodiments of the aircraft generator systems may include that an outlet of the at least one outlet of the working fluid flow path is configured to direct the working fluid to a portion of a low pressure turbine of the main engine.

In addition to one or more of the features described above, or as an alternative, further embodiments of the aircraft generator systems may include that an outlet of the at least one outlet of the working fluid flow path is configured to direct the working fluid to a portion of a high pressure turbine of the main engine.

In addition to one or more of the features described above, or as an alternative, further embodiments of the aircraft generator systems may include that an outlet of the at least one outlet of the working fluid flow path is configured to direct the working fluid to a bypass of the main engine.

In addition to one or more of the features described above, or as an alternative, further embodiments of the aircraft generator systems may include that an outlet of the at least one outlet of the working fluid flow path is configured to direct the working fluid overboard.

In addition to one or more of the features described above, or as an alternative, further embodiments of the aircraft generator systems may include that the generator is configured to generate electric power onboard the aircraft.

In addition to one or more of the features described above, or as an alternative, further embodiments of the aircraft generator systems may include that the generator is configured to drive rotation of a mechanical shaft and generate mechanical power.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
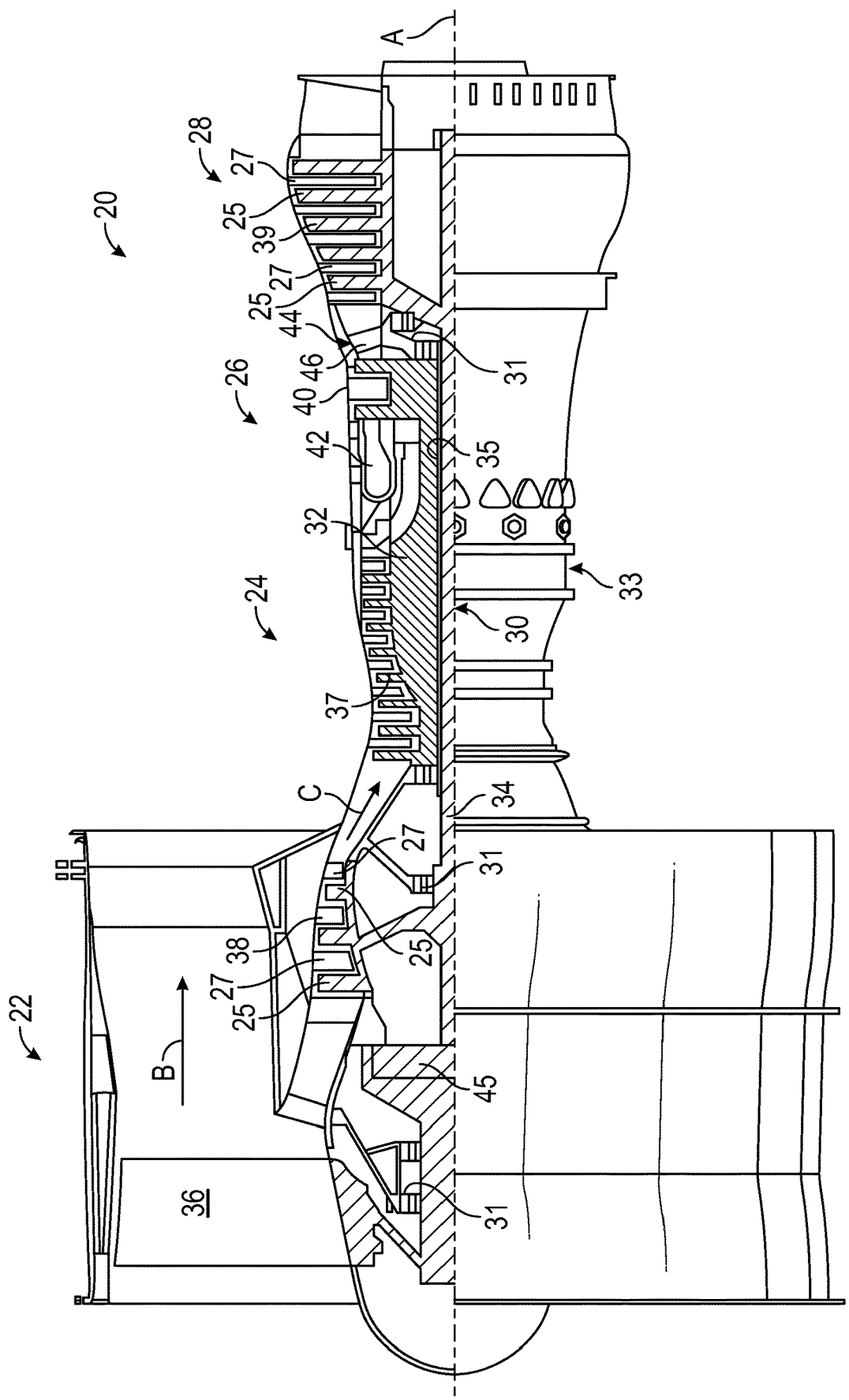
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high-speed spool 32 and the low-speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration. For example, the teachings provided herein may be applied to other types of engines. Some such example alternative engines may include, without limitation, turbojets, turboshafts, and other turbofan configurations (e.g., wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT")).

In accordance with embodiments of the present disclosure, subsystems or auxiliary systems are connected to main engines (e.g., gas turbine engines) in order to extract a portion of the air from the engine and use such air to drive operation of a generator and/or to provide cooling/working fluid to other aircraft systems (e.g., ECS, ACS, VACS). For example, aircraft need to reject heat from electrical systems and components that are used for avionics, sensors, and other onboard systems. As discussed above, heat rejection is often processed through aircraft cooling systems such as ACS, VACS, or ECS that release the energy through heat exchangers in the engine bypass. The use of bypass heat exchangers can be challenging from a performance, cost, and packaging standpoint. The heat exchangers can take different forms including pre-coolers which process bleed flow and waste heat exchangers which release heat from the ACS, VACS, and/or ECS.

In contrast to such heat exchanger-based systems, embodiments of the present disclosure are directed to bleed cooling systems that incorporate a generator arranged downstream of an engine bleed port and upstream of the ACS, VACS, and/or ECS. The generator consists of one or multiple stages of turbine expanders or expansion turbines that receive the bleed flow. The expansion turbines extract energy from the bleed flow. This extracted energy is used to turn a turbine shaft which is affixed to a generator and thus power can be produced. The expansion turbines, thus, reduce the temperature of the bleed flow entering the aircraft cooling system at some pressure penalty much like a heat exchanger but, advantageously, it does not heat up the bypass flow in the process. Such configurations, as described herein, can also produce power that can be used by electrical systems, pumps, actuators, or other onboard systems that employ power. In some embodiments, the aircraft generator system may be positioned as an external accessory to the engine or, in other embodiments, configured as multiple units around or distributed about the engine. It will be appreciated that in some embodiments, the aircraft generator system is a turbogenerator system. Such systems may be configured to generate electrical power onboard the aircraft. In other embodiments of the present disclosure, the output from the generator may be mechanical, in the form of rotation of a shaft which can drive a component, such as a fan.

Figure 2:
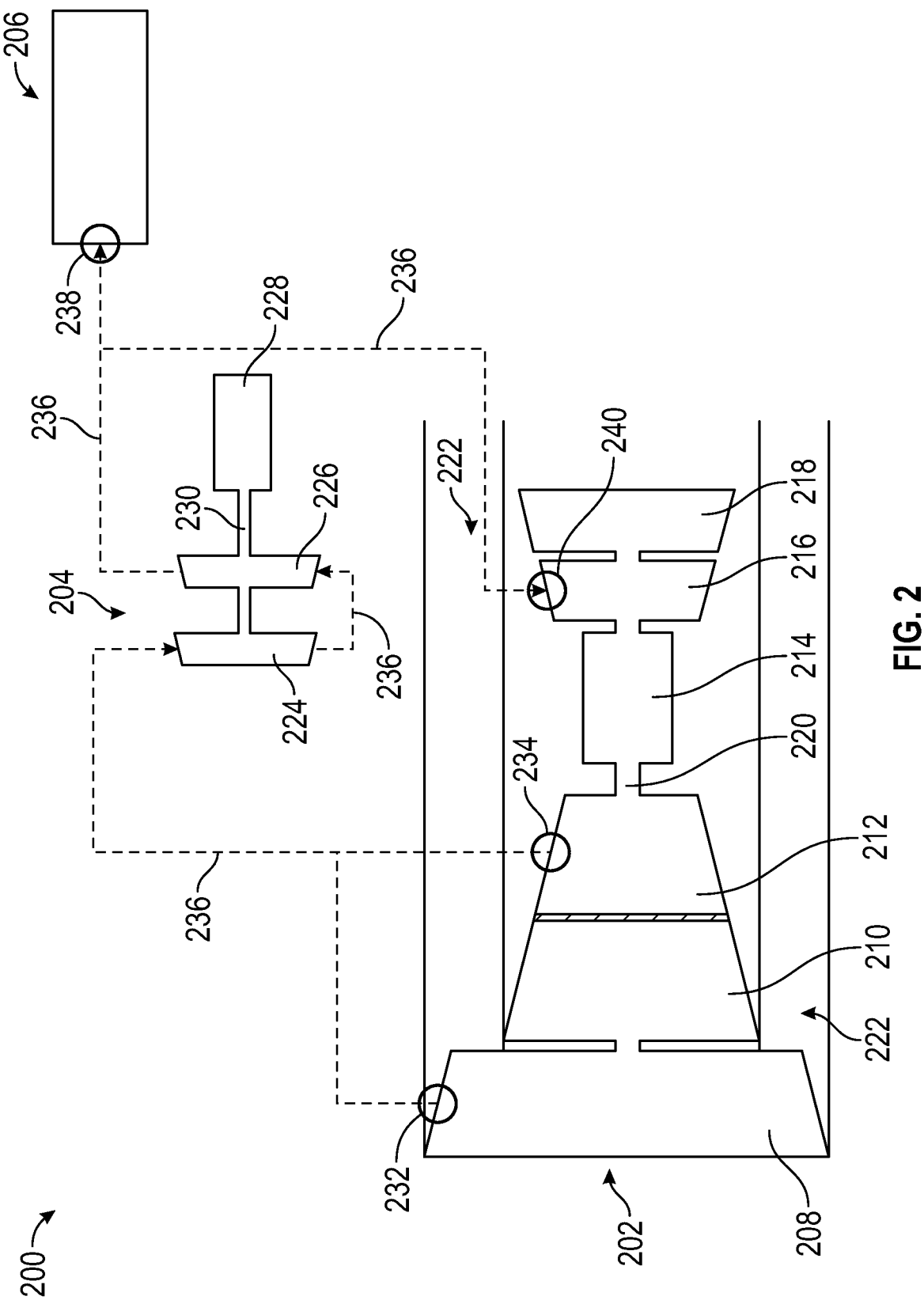
FIG. 2 is a schematic diagram of an aircraft generator system in accordance with an embodiment of the present disclosure.

Turning now to FIG. 2, a schematic illustration of an aircraft generator system 200 in accordance with an embodiment of the present disclosure is shown. The aircraft generator system 200 includes a main engine 202, a generator assembly 204, and an aircraft cooling system 206. The main engine 202 may be similar to that shown and described above with respect to FIG. 1, although other types of main engines may be employed without departing from the scope of the present disclosure.

The main engine 202 includes a fan 208, a low pressure compressor 210, a high pressure compressor 212, a combustor 214, a high pressure turbine 216, and a low pressure turbine 218 arranged along an engine shaft 220. The main engine 202 is arranged with a bypass 222 which bypasses a main gaspath that flows through the compressor section 210, 212, the combustor 214, and the turbine section 216, 218. As shown, the aircraft generator system 200 does not include a heat exchanger arranged within the bypass 222. In some configurations a single compressor may be employed or other compressor section configuration may be employed, and embodiments described herein are not limited to the engine configuration illustratively shown and described.

The generator assembly 204, in this embodiment, includes a first expansion turbine 224, a second expansion turbine 226, and a generator 228 arranged along a generator shaft 230. The generator 228 may be an electric or electrical generator, but may be also or alternatively be a mechanical system that includes one or more gear boxes and is configured to output mechanical power (e.g., rotation of a mechanical shaft). The aircraft cooling system 206 may be any supplementary or secondary system onboard an aircraft that may employ a cooling fluid, such as bleed air or cooled cooling air. In accordance with embodiments of the present disclosure the aircraft cooling system 206 is a system that generates heat and must have such heat removed or is a dedicated heat removal system, such as an ECS, ACS, VACS, etc., as will be appreciated by those of skill in the art.

The aircraft generator system 200 is configured to extract bleed air from one or more locations along the main engine 202. As shown, a first extraction point 232 is located about the fan 208 and a second extraction point 234 is located about the high pressure compressor 212. A working fluid is extracted from the one or more extraction points 232, 234 and pass through a working fluid flow path 236 to the generator assembly 204. The extraction points 232, 234 may be scoops, fluid ports, apertures, or the like that are arranged at one or more locations circumferentially about the main engine 202, such as along an interior surface (gaspath surface) of a case or frame the main engine 202. The working fluid (e.g., bleed air) may then be passed through the expansion turbines 224, 226 of the generator assembly 204. The working fluid may then pass along the working fluid flow path 236 to the aircraft cooling system 206 at a cooling system outlet 238 and/or reinjected into a main engine gaspath, such as at the turbine stage (e.g., turbines 216, 218) through an engine outlet 240 to be dumped overboard. As shown, and in accordance with embodiments of the present disclosure, there are no heat exchangers arranged along the working fluid flow path 236 between the extraction points 232, 234 and the outlets 238, 240. Rather, a change in temperature in the working fluid is achieved through the work extraction performed at the expansion turbines 224, 226 of the generator assembly 204.

As the working fluid is bled from the main engine 202, the air will be relatively warm and potentially high pressure, depending on where the working fluid is extracted. For example, at second extraction point 234 arranged axially proximate to the high pressure compressor 212 of the main engine 202, the working fluid (extracted bleed air) may have substantially higher pressure and temperature than a working fluid extracted from the first extraction point 232 proximate the fan 208 of the main engine 202.

As the working fluid is passed through the expansion turbines 224, 226, work will be performed, thus spinning the expansion turbines 224, 226. The working fluid will be expanded, thus lowing the pressure and temperature thereof. This rotation or work can drive rotation of the generator shaft 230, which can be used to operate a fan, generate electricity, or the like. The expanded (and thus cooled) working fluid may then be used to cool other systems onboard the aircraft, such as the aircraft cooling system 206. In some such configurations, the working fluid may be used to cool one or more components of the aircraft cooling system 206. This is illustrative as part of the working fluid flow path 236 that terminates at the aircraft cooling system 206 at the cooling system outlet 238. In some embodiments, the working fluid may then be dumped overboard or reinjected into the main gaspath stream of the main engine 202, such as at engine outlet 240. In some embodiments, the working fluid may be reinjected into the main engine 202 for the purpose of cooling components thereof, such as vanes, platforms, blades, etc. of the turbine section 216, 218 of the main engine 202. As described, and shown, there are no heat exchangers along the working fluid flow path 236, and the mechanism for conditioning the bleed air is through expansion in the expansion turbines 224, 226 of the generator assembly 204.

Figure 3:
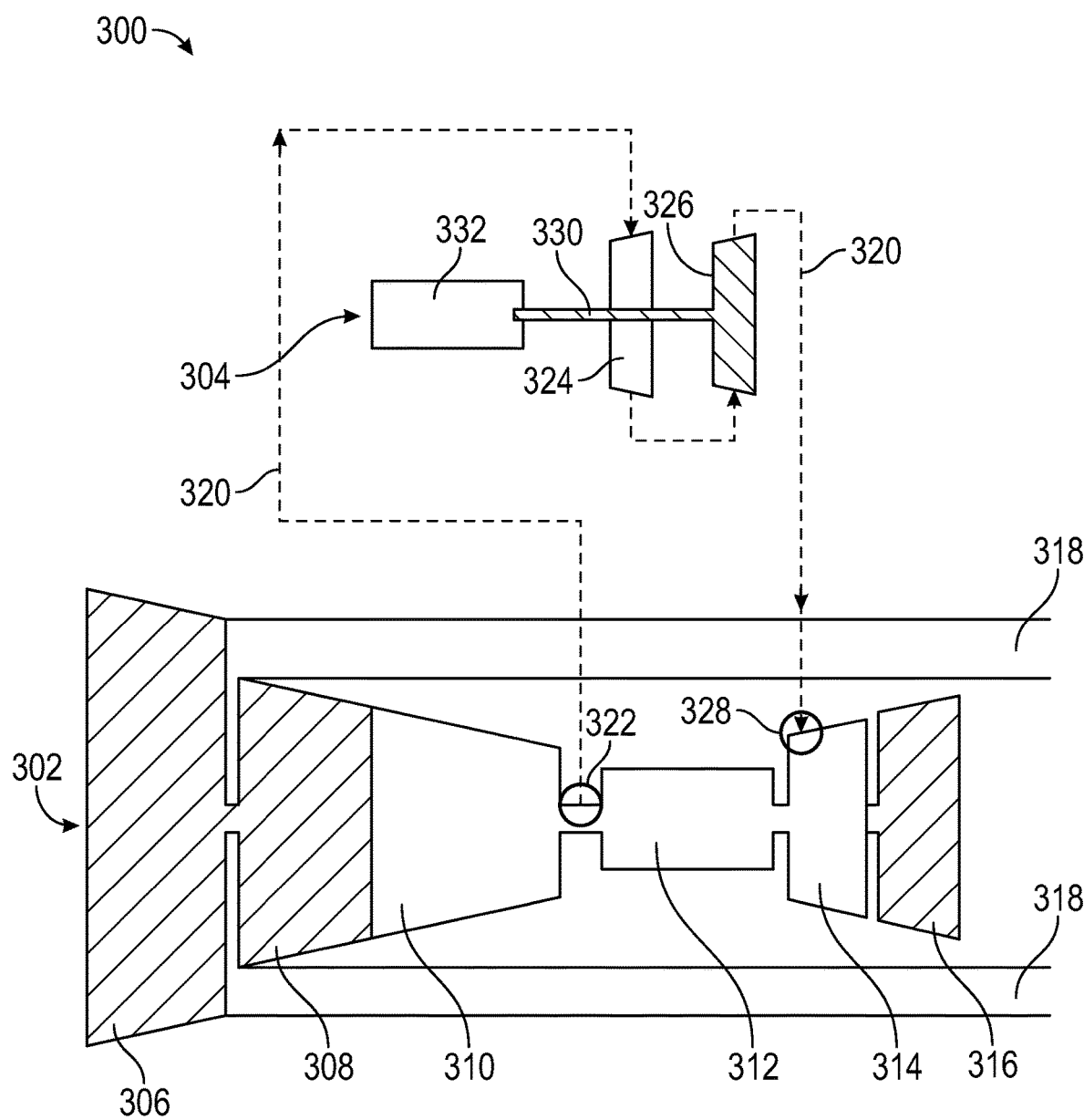
FIG. 3 is a schematic diagram of an aircraft generator system in accordance with an embodiment of the present disclosure.

Turning now to FIG. 3, a schematic illustration of an aircraft generator system 300 in accordance with an embodiment of the present disclosure is shown. The aircraft generator system 300 includes a main engine 302 and a generator assembly 304. The main engine 302 may be similar to that shown and described above with respect to FIG. 1, although other types of main engines may be employed without departing from the scope of the present disclosure. In this illustrative embodiment, the main engine 302 includes a fan 306, a low pressure compressor 308, a high pressure compressor 310, a combustor 312, a high pressure turbine 314, and a low pressure turbine 316 arranged along an engine shaft. The main engine 302 is arranged with a bypass 318 which bypasses a main gaspath that flows through the compressor section 308, 310, the combustor 312, and the turbine section 314, 316. As shown, the aircraft generator system 300 does not include a heat exchanger arranged within the bypass 318 or along a working fluid flow path 320.

In this configuration, the working fluid is extracted from an extraction point 322 that is downstream from the compressors 308, 310. The extraction may be a scoop, fluid port, aperture, or the like that is arranged at one or more locations circumferentially about the case or frame of the main engine 302, such as along an interior surface of a case or frame surrounding the mid-portion of the main engine 302, and upstream of the combustor 312. In such a configuration, the working fluid will have a relatively high pressure (e.g., as compared to the extraction points illustrated in FIG. 2). The working fluid may be directed along the working fluid flow path 320 to a first expansion turbine 324, a second expansion turbine 326, and then directed to an outlet 328 that is part of the high pressure turbine 314 of the main engine 302. In this configuration, the working fluid is reduced in temperature by the extraction of work at the first and second expansion turbines 324, 326. The driven first and second expansion turbines 324, 326 may be used to drive rotation of a generator shaft 330 to generate power at a generator 332. In some embodiments, the generator 332 may be an electric motor or generator or may be a fan that is rotationally driven by the generator shaft 330.

Similar to the embodiment shown in FIG. 2, there are no heat exchangers arranged along the working fluid flow path 320 between the extraction point 322 and the outlet 328. As such, the working fluid is not used directly as a heat sink (or source) for direct thermal exchange with another fluid, but rather, the thermal conditioning of the working fluid (bleed air) is achieved through the work performed at the expansion turbines 324, 326. The outlet 328 in this embodiment is arranged to supply the cooled working fluid to one or more components of the high pressure turbine 314, such as blades, vanes, platforms, blade outer air seals, and the like of the high pressure turbine 314.

Figure 4:
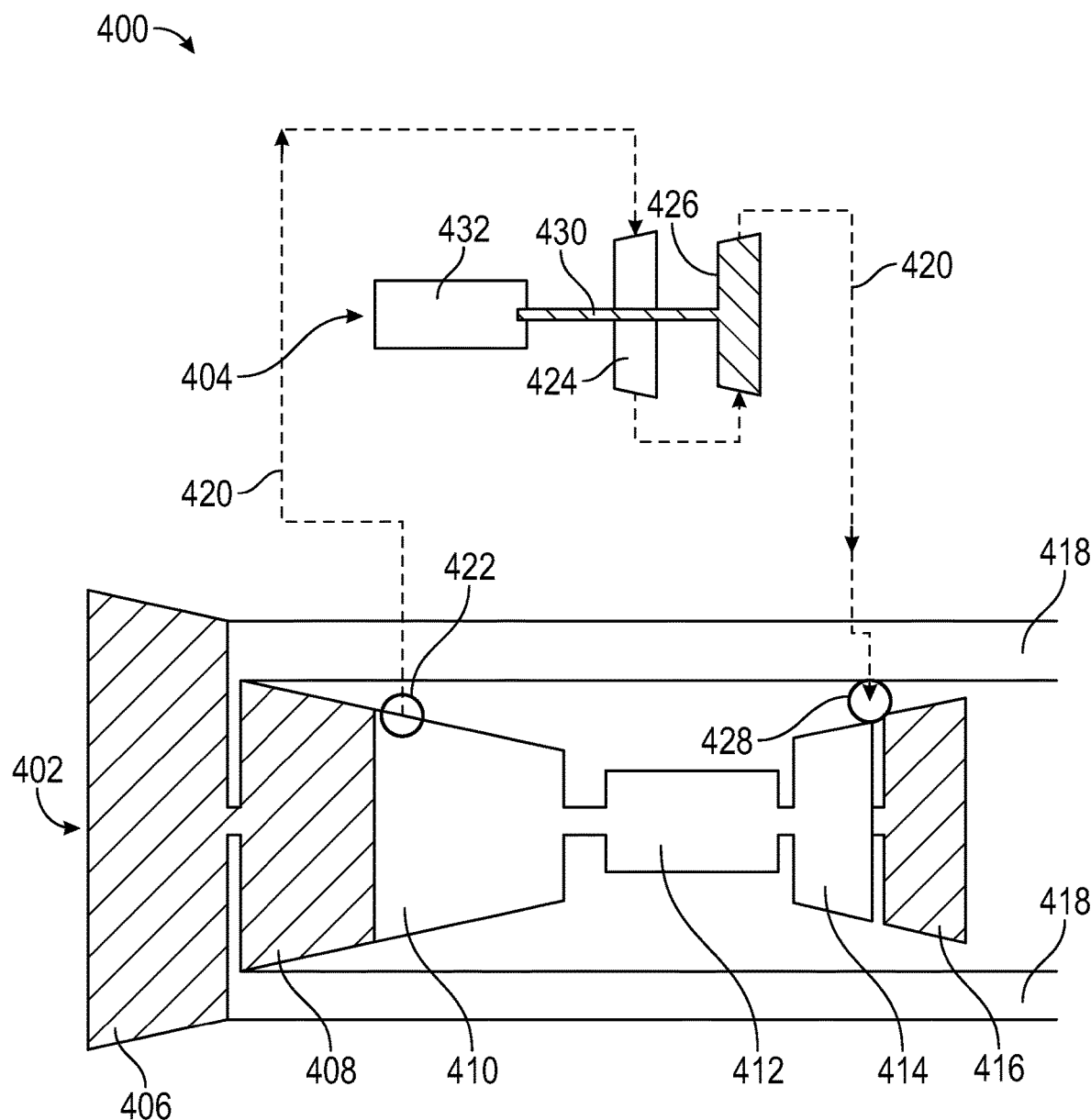
FIG. 4 is a schematic diagram of an aircraft generator system in accordance with an embodiment of the present disclosure.

Turning now to FIG. 4, a schematic illustration of an aircraft generator system 400 in accordance with an embodiment of the present disclosure is shown. The aircraft generator system 400 includes a main engine 402 and a generator assembly 404. The main engine 402 may be similar to that shown and described above with respect to FIG. 1, although other types of main engines may be employed without departing from the scope of the present disclosure. In this illustrative embodiment, the main engine 402 includes a fan 406, a low pressure compressor 408, a high pressure compressor 410, a combustor 412, a high pressure turbine 414, and a low pressure turbine 416 arranged along an engine shaft. The main engine 402 is arranged with a bypass 418 which bypasses a main gaspath that flows through the compressor section 408, 410, the combustor 412, and the turbine section 414, 416. As shown, the aircraft generator system 400 does not include a heat exchanger arranged within the bypass 418 or along a working fluid flow path 420.

In this configuration, the working fluid is extracted from an extraction point 422 that is from a mid-compressor location of the compressors 408, 410 (e.g., between the low-pressure and high pressure compressors). The extraction may be a scoop, fluid port, aperture, or the like that is arranged at one or more locations circumferentially about the compressor section 408, 410, such as along an interior surface of a case or frame surrounding the compressors 408, 410. The working fluid may be directed along the working fluid flow path 420 to a first expansion turbine 424, a second expansion turbine 426, and then directed to an outlet 428 that is part of the low pressure turbine 416 of the main engine 402. In this configuration, the working fluid is reduced in temperature by the extraction of work at the first and second expansion turbines 424, 426. The driven first and second expansion turbines 424, 426 may be used to drive rotation of a generator shaft 430 to generate power at a generator 432. In some embodiments, the generator 432 may be an electric motor or generator or may be a fan that is rotationally driven by the generator shaft 430.

Similar to the embodiment shown in FIGS. 2-3, there are no heat exchangers arranged along the working fluid flow path 420 between the extraction point 422 and the outlet 428. As such, the working fluid is not used directly as a heat sink (or source) for direct thermal exchange with another fluid, but rather, the thermal conditioning of the working fluid (bleed air) is achieved through the work performed at the expansion turbines 424, 426. The outlet 428 in this embodiment is arranged to supply the cooled working fluid to one or more components of the low pressure turbine 416, such as blades, vanes, platforms, blade outer air seals, and the like of the low pressure turbine 416.

Figure 5:
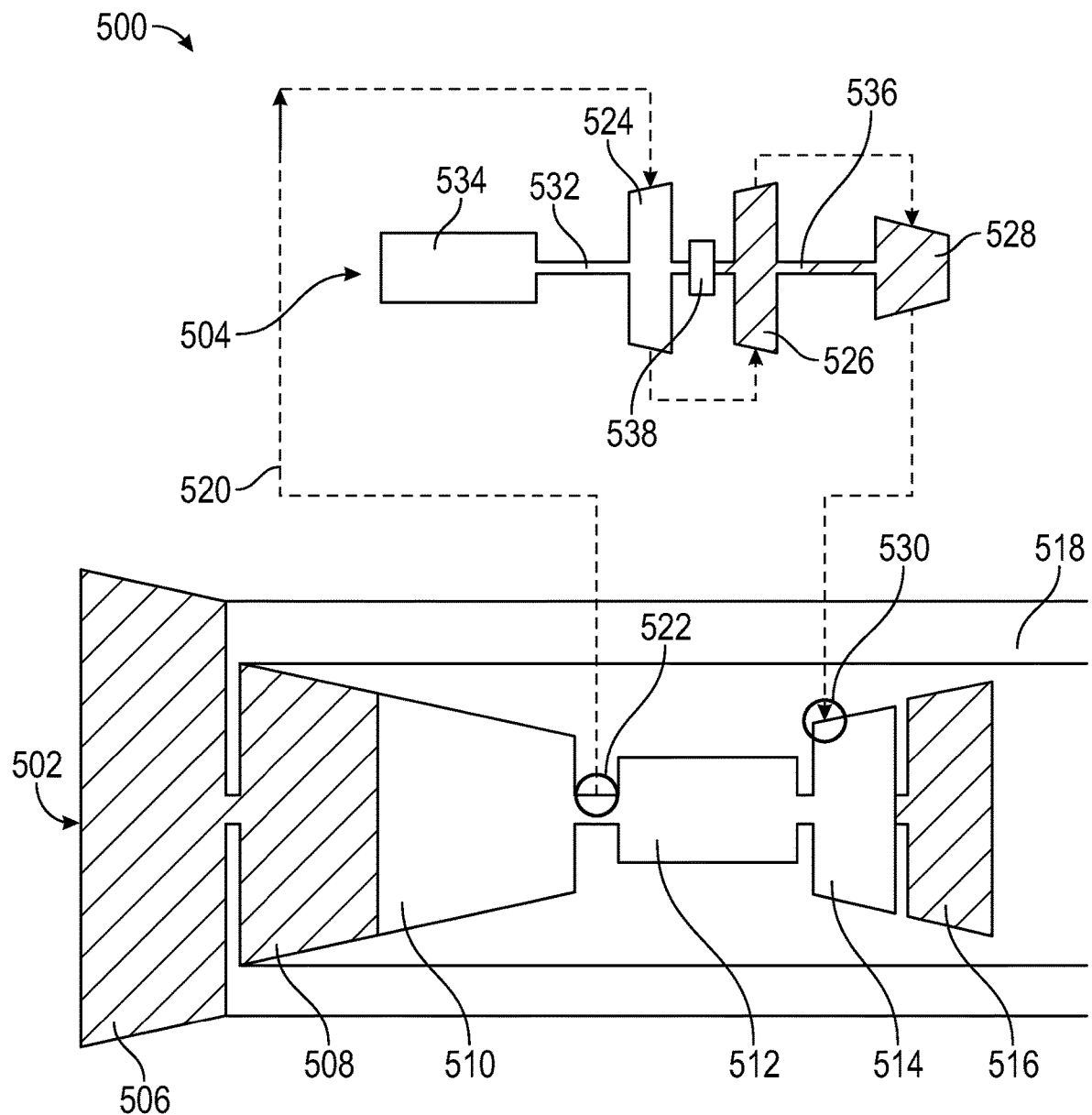
FIG. 5 is a schematic diagram of an aircraft generator system in accordance with an embodiment of the present disclosure.

Turning now to FIG. 5, a schematic illustration of an aircraft generator system 500 in accordance with an embodiment of the present disclosure is shown. The aircraft generator system 500 includes a main engine 502 and a generator assembly 504. The main engine 502 may be similar to that shown and described above with respect to FIG. 1, although other types of main engines may be employed without departing from the scope of the present disclosure. In this illustrative embodiment, the main engine 502 includes a fan 506, a low pressure compressor 508, a high pressure compressor 510, a combustor 512, a high pressure turbine 514, and a low pressure turbine 516 arranged along an engine shaft. The main engine 502 is arranged with a bypass 518 which bypasses a main gaspath that flows through the compressor section 508, 510, the combustor 512, and the turbine section 514, 516. As shown, the aircraft generator system 500 does not include a heat exchanger arranged within the bypass 518 or along a working fluid flow path 520.

In this configuration, the working fluid is extracted from an extraction point 522 that is downstream from the compressors 508, 510. The extraction may be a scoop, fluid port, aperture, or the like that is arranged at one or more locations circumferentially about the compressors 508, 510, such as along an interior surface of a case or frame surrounding the compressors 508, 510 and upstream of the combustor 512. In such a configuration, the working fluid will have a relatively high pressure (e.g., as compared to the extraction points illustrated in FIG. 2). The working fluid may be directed along the working fluid flow path 520 to a first expansion turbine 524, a second expansion turbine 526, and then increased in pressure within a boost compressor 528. The boosted pressure working fluid may then be directed to an outlet 530 that is part of the high pressure turbine 514 of the main engine 502. In this configuration, the working fluid is reduced in temperature by the extraction of work at the first and second expansion turbines 524, 526 and the pressure may be boosted at the boost compressor 528. The driven first and second expansion turbines 524, 526 may be used to drive rotation of a generator shaft 532 to generate power at a generator 534. In some embodiments, the generator 534 may be an electric motor or generator or may be a fan that is rotationally driven by the generator shaft 532.

In this embodiment, the generator assembly 504 includes a dual-shaft configuration, with a compressor shaft 536 operably connected one or both of the expansion turbines 524, 526 and to the boost compressor 528. In some embodiments, the generator shaft 532 and the compressor shaft 536 may be disconnected or decoupled, with each shaft 532, 536 driven by a respective expansion turbine 524, 526. For example, the first expansion turbine 524 may be operably coupled to the generator shaft 532 and the second expansion turbine 526 is operably coupled to the compressor shaft 528. In some embodiments, a geared connection 538 between the two shafts 532, 536 may be employed. The gearing can enable transfer of rotation from one shaft to another shaft. In still other embodiments, the two shafts 532, 536 may be fixedly connected such that each shaft is driven at the same speed (e.g., a single speed driven by rotation of both expansion turbines 524, 526). The decoupling of the two shafts 532, 536 of the generator assembly 504 can enable driving the generator 534 and the boost compressor 528 at different rotational speeds without significant losses or gearing, for example.

Similar to the embodiment shown in FIGS. 2-4, there are no heat exchangers arranged along the working fluid flow path 520 between the extraction point 522 and the outlet 530. As such, the working fluid is not used directly as a heat sink (or source) for direct thermal exchange with another fluid, but rather, the thermal conditioning of the working fluid (bleed air) is achieved through the work performed at the expansion turbines 524, 526. The outlet 530 in this embodiment is arranged to supply the cooled working fluid to one or more components of the high pressure turbine 514, such as blades, vanes, platforms, blade outer air seals, and the like of the high pressure turbine 514.

Figure 6:
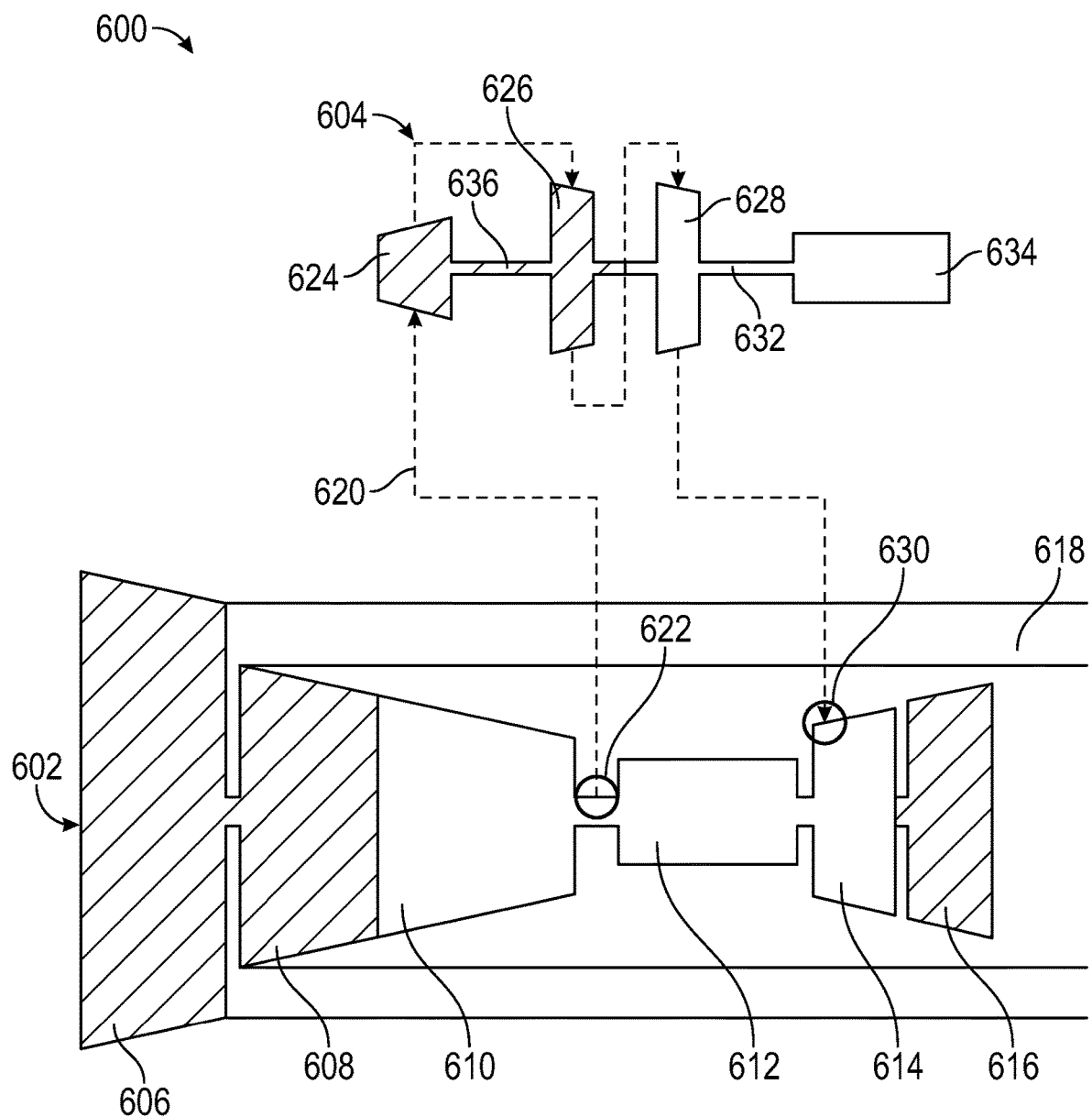
FIG. 6 is a schematic diagram of an aircraft generator system in accordance with an embodiment of the present disclosure.

Turning now to FIG. 6, a schematic illustration of an aircraft generator system 600 in accordance with an embodiment of the present disclosure is shown. The aircraft generator system 600 includes a main engine 602 and a generator assembly 604. The main engine 602 may be similar to that shown and described above with respect to FIG. 1, although other types of main engines may be employed without departing from the scope of the present disclosure. In this illustrative embodiment, the main engine 602 includes a fan 606, a low pressure compressor 608, a high pressure compressor 610, a combustor 612, a high pressure turbine 614, and a low pressure turbine 616 arranged along an engine shaft. The main engine 602 is arranged with a bypass 618 which bypasses a main gaspath that flows through the compressor section 608, 610, the combustor 612, and the turbine section 614, 616. As shown, the aircraft generator system 600 does not include a heat exchanger arranged within the bypass 618 or along a working fluid flow path 620.

In this configuration, the working fluid is extracted from an extraction point 622 that is downstream from the compressors 608, 610. The extraction may be a scoop, fluid port, aperture, or the like that is arranged at one or more locations circumferentially about the compressors 608, 610, such as along an interior surface of a case or frame surrounding the compressors 608, 610 and upstream of the combustor 612. In such a configuration, the working fluid will have a relatively high pressure (e.g., as compared to the extraction points illustrated in FIG. 2). The working fluid may be directed along the working fluid flow path 620 to a boost compressor 624, a first expansion turbine 626, and a second expansion turbine 628. The boosted pressure working fluid be used to assist the driving of one or both of the expansion turbines 626, 628 and then directed to an outlet 630 that is part of the high pressure turbine 614 of the main engine 602. In this configuration, the working fluid is reduced in temperature by the extraction of work at the first and second expansion turbines 626, 628. The driven first and second expansion turbines 626, 628 may be used to drive rotation of a generator shaft 632 to generate power at a generator 634. In some embodiments, the generator 634 may be an electric motor or generator or may be a fan that is rotationally driven by the generator shaft 632.

In this embodiment, the generator assembly 604 includes a dual-shaft configuration, with a compressor shaft 636 operably connected one or both of the expansion turbines 626, 628 and to the boost compressor 628. In some embodiments, the generator shaft 632 and the compressor shaft 636 may be disconnected or decoupled, with each shaft 632, 636 driven by a respective expansion turbine 626, 628. For example, in this embodiment, the first expansion turbine 626 is operably coupled to the compressor shaft 632 and the second expansion turbine 628 is operably coupled to the generator shaft 632. In other embodiments, a geared connection between the two shafts 632, 636 may be employed. In still other embodiments, the two shafts 632, 636 may be fixedly connected such that each shaft is driven at the same speed (e.g., a single speed driven by rotation of both expansion turbines 626, 628). The decoupling of the two shafts 636, 632 of the generator assembly 604 can enable driving the generator 634 and the boost compressor 624 at different rotational speeds without significant losses or gearing, for example.

Similar to the embodiment shown in FIGS. 2-5, there are no heat exchangers arranged along the working fluid flow path 620 between the extraction point 622 and the outlet 630. As such, the working fluid is not used directly as a heat sink (or source) for direct thermal exchange with another fluid, but rather, the thermal conditioning of the working fluid (bleed air) is achieved through the work performed at the expansion turbines 626, 628. The outlet 630 in this embodiment is arranged to supply the cooled working fluid to one or more components of the high pressure turbine 614, such as blades, vanes, platforms, blade outer air seals, and the like of the high pressure turbine 614.

Figure 7:
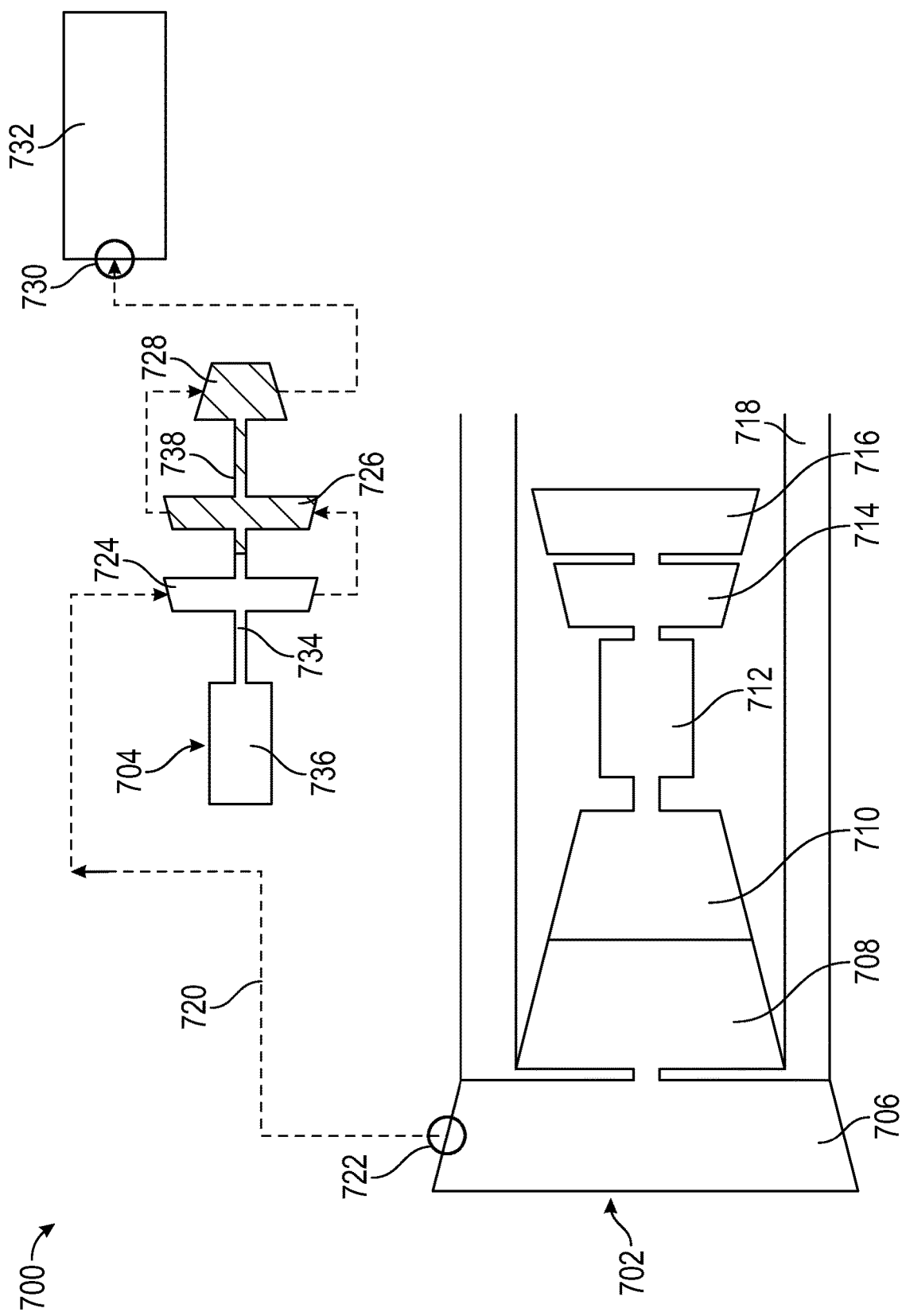
FIG. 7 is a schematic diagram of an aircraft generator system in accordance with an embodiment of the present disclosure.

Turning now to FIG. 7, a schematic illustration of an aircraft generator system 700 in accordance with an embodiment of the present disclosure is shown. The aircraft generator system 700 includes a main engine 702 and a generator assembly 704. The main engine 702 may be similar to that shown and described above with respect to FIG. 1, although other types of main engines may be employed without departing from the scope of the present disclosure. In this illustrative embodiment, the main engine 702 includes a fan 706, a low pressure compressor 708, a high pressure compressor 710, a combustor 712, a high pressure turbine 714, and a low pressure turbine 716 arranged along an engine shaft. The main engine 702 is arranged with a bypass 718 which bypasses a main gaspath that flows through the compressor section 708, 710, the combustor 712, and the turbine section 714, 716. As shown, the aircraft generator system 700 does not include a heat exchanger arranged within the bypass 718 or along a working fluid flow path 720.

In this configuration, the working fluid is extracted from an extraction point 722 proximate the fan 706. The extraction may be a scoop, fluid port, aperture, or the like that is arranged at one or more locations circumferentially about the fan 706, such as along an interior surface of a case or frame surrounding the fan 706. The working fluid may be directed along the working fluid flow path 620 to a first expansion turbine 724, a second expansion turbine 726, and a boost compressor 728. The extracted bleed is used to assist the driving of one or both of the expansion turbines 724, 726 and then is boosted in pressure at the boost compressor 728 and directed subsequently directed to an outlet 730 at an aircraft cooling system 732.

In this configuration, the working fluid is reduced in temperature by the extraction of work at the first and second expansion turbines 724, 726. The driven first and second expansion turbines 724, 726 may be used to drive rotation of a generator shaft 734 to generate power at a generator 736. In some embodiments, the generator 736 may be an electric motor or generator or may be a fan that is rotationally driven by the generator shaft 734.

In this embodiment, the generator assembly 704 includes a dual-shaft configuration, with a compressor shaft 738 operably connected one or both of the expansion turbines 724, 738 and to the boost compressor 728. In some embodiments, the generator shaft 734 and the compressor shaft 738 may be disconnected or decoupled, with each shaft 734, 738 driven by a respective expansion turbine 724, 726. For example, in this embodiment, the first expansion turbine 724 is operably coupled to the generator shaft 734 and the second expansion turbine 726 is operably coupled to the compressor shaft 738. In other embodiments, a geared connection between the two shafts 734, 738 may be employed. In still other embodiments, the two shafts 734, 738 may be fixedly connected such that each shaft is driven at the same speed (e.g., a single speed driven by rotation of both expansion turbines 724, 726). The decoupling of the two shafts 724, 726 of the generator assembly 704 can enable driving the generator 736 and the boost compressor 728 at different rotational speeds without significant losses or gearing, for example.

In accordance with embodiments of the present disclosure, there are no heat exchangers arranged along the working fluid flow path 720 between the extraction point 722 and the outlet 730. As such, the working fluid is not used directly as a heat sink (or source) for direct thermal exchange with another fluid, but rather, the thermal conditioning of the working fluid (bleed air) is achieved through the work performed at the expansion turbines 724, 726. The outlet 730 in this embodiment is arranged to supply the cooled working fluid to one or more components of the aircraft cooling system 732. The cooled cooling air generated by bleed air passing along the working fluid flow path 720 provides an aircraft with cooling air that does not require heat exchanges. Further, such system is configured to generate additional work or power through inclusion of the generator 736 which is driven by the cooling process that occurs as the bleed air is expanded in the expansion turbines 724, 726.

Figure 8:
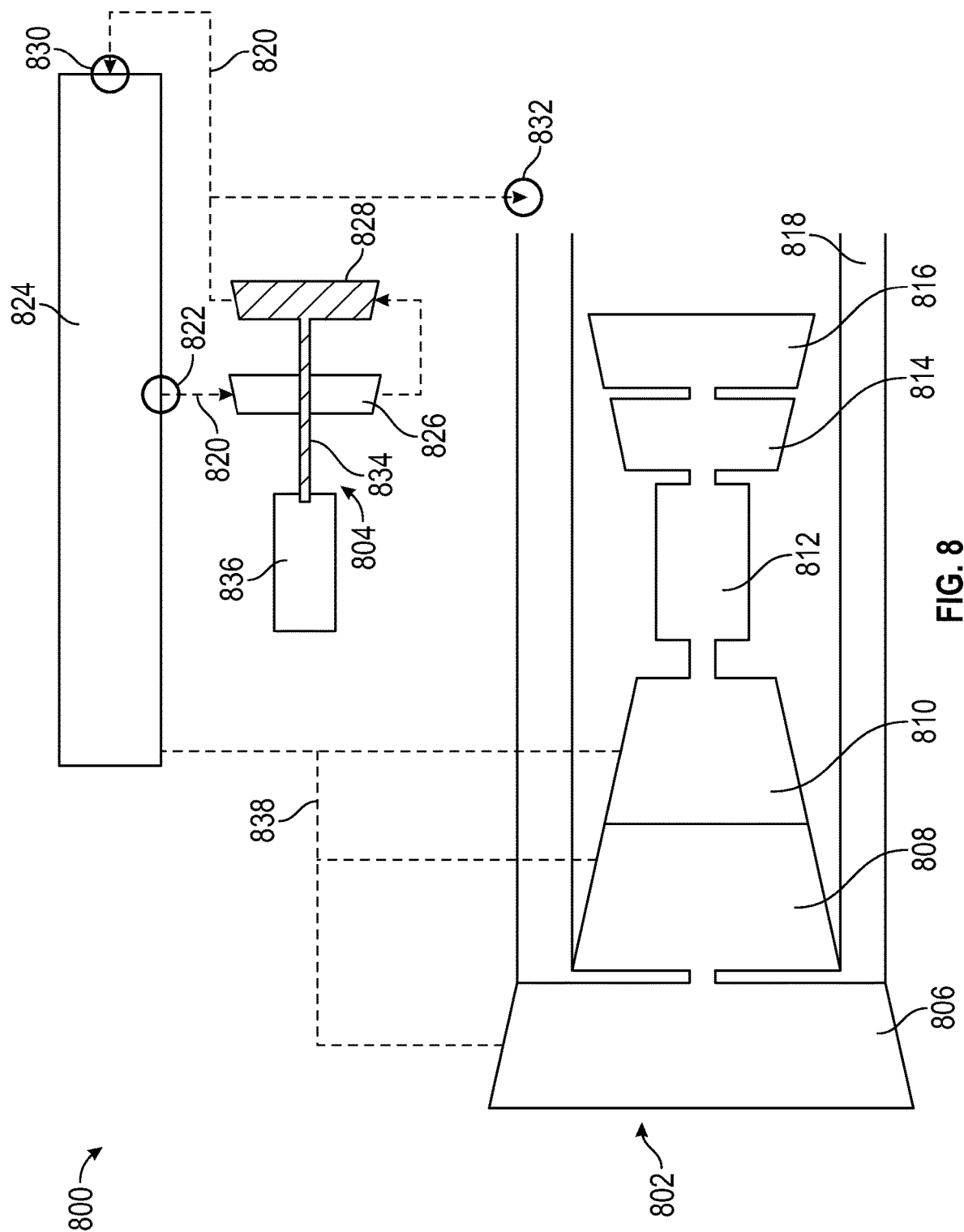
FIG. 8 is a schematic diagram of an aircraft generator system in accordance with an embodiment of the present disclosure.

Turning now to FIG. 8, a schematic illustration of an aircraft generator system 800 in accordance with an embodiment of the present disclosure is shown. The aircraft generator system 800 includes a main engine 802 and a generator assembly 804. The main engine 802 may be similar to that shown and described above with respect to FIG. 1, although other types of main engines may be employed without departing from the scope of the present disclosure. In this illustrative embodiment, the main engine 802 includes a fan 806, a low pressure compressor 808, a high pressure compressor 810, a combustor 812, a high pressure turbine 814, and a low pressure turbine 816 arranged along an engine shaft. The main engine 802 is arranged with a bypass 818 which bypasses a main gaspath that flows through the compressor section 808, 810, the combustor 812, and the turbine section 814, 816. As shown, the aircraft generator system 800 does not include a heat exchanger arranged within the bypass 818 or along a working fluid flow path 820 of the generator assembly 804.

In this configuration, the working fluid is extracted from an extraction point 822 that is arranged on an aircraft cooling system 824. The extraction may be a scoop, fluid port, aperture, or the like that is arranged at one or more locations on the aircraft cooling system 824. The working fluid may be directed along the working fluid flow path 820 to a first expansion turbine 826 and a second expansion turbine 828. The extracted air is used to assist the driving of one or both of the expansion turbines 826, 828 and is then directed to one or more outlets 830, 832. A first outlet 830, in this embodiment, is a port redirecting the cooled air back to the aircraft cooling system 824 and a second outlet 832, in this embodiment, is a port to dump the cooled air into the bypass 818 and/or directly overboard.

In this configuration, the working fluid is reduced in temperature by the extraction of work at the first and second expansion turbines 826, 828. The driven first and second expansion turbines 826, 828 may be used to drive rotation of a generator shaft 834 generate power at a generator 836. In some embodiments, the generator 836 may be an electric motor or generator or may be a fan that is rotationally driven by the generator shaft 834.

In this embodiment, the extraction point 822 is not directly on the main engine 802 as in other configurations, but rather is sourced from the aircraft cooling system 824. The aircraft cooling system 824 may be sourced with bleed air from the main engine 802 from one or more locations (e.g., at the locations described above in other embodiments) and passed through a cooling system supply path 838. In this configuration, the bleed air may pass first through the aircraft cooling system 824 prior to entering the generator assembly 804 to generate power at the generator 836 and/or cool the air further through the expansion turbines 826, 828. This configuration leverages waste heat that may be generated by the aircraft cooling system 824.

Although shown in different embodiments with the extraction point(s) arranged about specific locations (e.g., fan, low pressure compressor, high pressure compressor, aft of the compressor section, etc.), such extraction points are not intended to be limiting. Rather, in another configuration similar to that shown in FIG. 7, an aircraft generator system in accordance with the present disclosure may have an extraction point as shown in the other embodiments described herein, or elsewhere on the main engine. For example, in any of the embodiments described herein, and not limited to FIG. 7, extraction points may be arranged about the fan, the low pressure compressor, the high pressure compressor, and/or aft of the high pressure compressor but upstream of the combustor, and combinations thereof. That is, in some embodiments, multiple extraction points may be arranged axially along the length of the main engine (e.g., at the fan and at the high pressure compressor). Further, in some embodiments, multiple extraction points may be arranged circumferentially about the main engine at the same or substantially similar axial locations along the axis of the main engine. Further still, both multiple axial and multiple circumferential locations may be used in accordance with embodiments of the present disclosure for extracting bleed air from the main engine.

Further, the embodiments shown and described herein may be modified to include features from other embodiments, without departing from the scope of the present disclosure. For example, as discussed, the location of the extraction points may be modified from the specific illustrative embodiment. Additionally, the inclusion of a boost compressor may be added to the embodiments that do not include such boost compressor, or such compressor may be removed from the illustrative embodiments that include such compressor. Furthermore, the compressor may be arranged either upstream of the expansion turbines or downstream of the expansion turbines, as shown in FIGS. 5-6, or between the expansion turbines, if such configuration is required by aircraft and/or operational requirements.

Additionally, the outlet(s) may be arranged at various (and multiple) locations both along the main engine (e.g., low pressure turbine, high pressure turbine, bypass). Further, as described, the outlet may be configured to direct the cooled bleed air to an aircraft cooling system (e.g., ECS, ACS, VACS, etc.) and/or may be dumped overboard, or combinations thereof.

Although shown and described with a dual-expansion turbine configuration in each of the above illustrative embodiments, such numerical setup is required. That is, in some configurations, a single expansion turbine may be employed to drive rotation of one or more shafts, such as a generator shaft and/or a boost compressor shaft. In some such embodiments, the single expansion turbine can drive one shaft at a first one-to-one ratio/speed and a second shaft may be coupled to the expansion turbine through a gearing system, thus enabling two different output speeds for two different shafts. In still other embodiments, more than two expansion turbines may be incorporated into the system. In some such embodiments, one or both shafts in a dual-shaft configuration may include multiple expansion turbines operably connected or attached thereto. For example, in some embodiments, two expansion turbines may be arranged on the generator shaft, and a single expansion turbine may be arranged on the boost compressor shaft. The selection of the number of expansion turbines in systems in accordance with the present disclosure may be based on weight, power, torque, expansion/cooling capabilities, or the like. As such, the illustrative configurations are not intended to be limiting, but rather are provided merely for explanatory purposes.

Advantageously, embodiments described herein are directed to improved bleed air conditioning onboard aircraft and systems that provide for additional power generation while cooling air for use onboard an aircraft. In accordance with some embodiments, a reduction in bleed temperatures can be achieved through the use of one or more expansion turbines, which can be advantageous to overall system aircraft cooling effectiveness. Additionally, embodiments described herein provide for a relatively small package/volume requirement that generates power. Further, such power generation does not require any combustion itself to function as bleed air drives the rotation of the expansion turbines and thus the shaft and generator. Moreover, advantageously, embodiments described herein can replace, mitigate, or reduce the need for heat exchangers onboard aircraft.

Further, advantageously, in accordance with some embodiments, the systems may reduce the temperature of waste heat air coming from the aircraft cooling systems. This can be advantageous to overall system cooling effectiveness in a closed loop system. The reduction of waste heat temperature may allow exhaust of the waste heat into the bypass or overboard with reduced impacts.

Advantageously, some embodiments of the present disclosure are directed to leveraging a turbo-compressor generator to reduce the temperature of high pressure core bleed flow so it can be used as cooled cooling air by core components, including turbine airfoils and disks and/or aircraft cooling systems. The turbo-compressor consists of one or multiple stages of turbine expanders or expansion turbines that receive the bleed flow. The expansion turbine stages extract energy from the bleed flow which in turn rotate a turbine shaft which is affixed to a generator which produces power. The turbo expanders, thus, reduce the temperature of the bleed flow such that it is lower than the temperature exiting the extraction point (e.g., fan or compressor of main engine). Given that pressure is needed for the cooling and the turbine expansion introduces some losses, the turboexpander can optionally include a boost compressor to increase the pressure before or after going through expansion turbines.

The power produced by the turbogenerator can be used by electrical systems, pumps, actuators, and/or other onboard systems. The turbogenerator (or multiple turbogenerators)

can be positioned as an external accessory to the main engine or may be configured as multiple units around the main engine. The turbogenerator assemblies described herein may be optimized to receive high pressure bleed from a high-pressure compressor of the main engine. This high pressure bleed air can be used to produce cooled cooling air for the high-pressure turbine, with the bleed air cooled through the expansion turbines. In alternative embodiments, extraction of bleed air from mid-compressor locations can be used to provide cooled air to the low pressure turbine of the main engine. Other configurations may be employed as shown and described herein, or based thereupon, as will be appreciated by those of skill in the art.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft generator system comprising:
a main engine having a fan, a compressor section, and a turbine section arranged along an engine shaft;
a generator assembly having a dual-shaft configuration with a first expansion turbine operably connected to a generator by a generator shaft and a second expansion turbine operably connected to a boost compressor by a compressor shaft, wherein the generator shaft is coupled to the compressor shaft by a geared connection; and
a working fluid flow path defined between at least one extraction point at, at least, one of the fan and the compressor section of the main engine and at least one outlet, wherein a working fluid in the working fluid flow path is configured to flow from the at least one extraction point and through the first expansion turbine to drive rotation of the generator shaft to generate power at the generator, through the second expansion turbine to drive rotation of the compressor shaft to drive rotation of the boost compressor, and through the boost compressor where pressure of the working fluid is increased prior to passing to the at least one outlet,
wherein no heat exchangers are arranged between the at least one extraction point and the at least one outlet along the working fluid flow path.

2. The aircraft generator system of claim 1, wherein the compressor section comprises a low pressure compressor and a high pressure compressor.

3. The aircraft generator system of claim 2, wherein the at least one extraction point comprises one or more extraction points arranged about the high pressure compressor of the main engine.

4. The aircraft generator system of claim 2, wherein the at least one extraction point comprises one or more extraction points arranged about the low pressure compressor of the main engine.

5. The aircraft generator system of claim 2, wherein the at least one extraction point comprises one or more extraction points arranged aft of the high pressure compressor of the main engine.

6. The aircraft generator system of claim 1, wherein the at least one extraction point comprises two or more extraction points arranged at different axial positions along an axis of the main engine.

7. The aircraft generator system of claim 1, further comprising an aircraft cooling system, wherein an outlet of the at least one outlet of the working fluid flow path is fluidly connected to the aircraft cooling system downstream of the at least one expansion turbine.

8. The aircraft generator system of claim 1, wherein an outlet of the at least one outlet of the working fluid flow path is configured to direct the working fluid to a portion of a low pressure turbine of the main engine.

9. The aircraft generator system of claim 1, wherein an outlet of the at least one outlet of the working fluid flow path is configured to direct the working fluid to a portion of a high pressure turbine of the main engine.

10. The aircraft generator system of claim 1, wherein an outlet of the at least one outlet of the working fluid flow path is configured to direct the working fluid to a bypass flow of the main engine.

11. The aircraft generator system of claim 1, wherein an outlet of the at least one outlet of the working fluid flow path is configured to direct the working fluid overboard from an aircraft.

12. The aircraft generator system of claim 1, wherein the generator is configured to generate electric power onboard an aircraft.

13. The aircraft generator system of claim 1, wherein the generator is configured to drive rotation of a mechanical shaft and generate mechanical power.

* * * * *